United States Patent
Jong

(10) Patent No.: US 6,622,341 B2
(45) Date of Patent: Sep. 23, 2003

(54) POSITION SHIFTING PLATE FOR AN AIR BLOWING DEVICE

(75) Inventor: Jung-Chang Jong, Ping Chang (TW)

(73) Assignee: Jenn Feng Industrial Co., Ltd. (TW)

( * ) Notice: Subject to any disclaimer, the term of this patent is extended or adjusted under 35 U.S.C. 154(b) by 19 days.

(21) Appl. No.: 09/855,131

(22) Filed: May 14, 2001

(65) Prior Publication Data

US 2002/0166197 A1 Nov. 14, 2002

(51) Int. Cl.[7] .............................. A47L 9/00; A47L 5/00; A47L 9/02; F04D 29/70
(52) U.S. Cl. ............................. 15/338; 15/422; 15/328; 15/330; 415/121.2
(58) Field of Search .................... 15/338, 330, 328, 15/405, 422, 344; 415/121.2, 169.1

(56) References Cited

U.S. PATENT DOCUMENTS

| | | | | |
|---|---|---|---|---|
| 3,353,338 A | * | 11/1967 | Nilsson | 96/385 |
| 4,118,826 A | * | 10/1978 | Kaeser | 15/328 |
| D299,571 S | * | 1/1989 | Kiyooka et al. | D32/15 |
| 5,222,275 A | * | 6/1993 | Baker et al. | 15/329 |
| D358,912 S | * | 5/1995 | Baker et al. | D32/15 |
| D386,841 S | | 11/1997 | DeMore et al. | D32/15 |
| D400,322 S | | 10/1998 | Webster et al. | D32/15 |
| D405,566 S | | 2/1999 | Webster et al. | D32/15 |
| 5,926,910 A | * | 7/1999 | Nishimura et al. | 15/415.1 |
| 6,442,790 B1 | * | 9/2002 | Svoboda et al. | 15/330 |

* cited by examiner

Primary Examiner—Robert J. Warden, Sr.
Assistant Examiner—Laura C Cole
(74) Attorney, Agent, or Firm—Ostrolenk, Faber, Gerb & Soffen, LLP

(57) ABSTRACT

A position shifting plate for an air blowing device includes a casing having an inlet defined in an underside of the casing and an outlet defined in an end of the casing. An annular neck extends from the underside of the casing and encloses the inlet. A gap is defined between the underside of the casing and the neck. A guide member extends from the underside of the casing. A shifting plate has a grated portion and a hole. A flange extends from the shifting plate and two rails extend inward from the flange so as to be movably inserted in the gap. The shifting plate movably contacts the guide member to shift the hole or the grated portion to cover the inlet of the casing.

6 Claims, 6 Drawing Sheets

POSITION SHIFTING PLATE FOR AN AIR BLOWING DEVICE

FIELD OF THE INVENTION

The present invention relates to a position shifting plate movably connected to an air blowing device and the plate comprises a grated portion and a hole. The two portions of the plate are movably engaged with an inlet of the blowing device.

BACKGROUND OF THE INVENTION

A conventional air blower generally includes a casing in which a motor is received, an inlet and an outlet. The inlet is used as a sucking hole to suck leaves or dirt and the outlet is used to blow leaves or dirt on the ground away. In other words, the conventional air blowing device has two different functions and each of the inlet and the outlet is used to achieve a certain purpose. A grated member is engaged with the inlet to prevent from objects entering the blowing device to break the parts in the blowing device. However, the grated member is connected to the casing by screws so that the user has to use tools such as screwdrivers to connect or disconnect the grated member from the blowing device. That is to say, if the user wants to connect a tube to the inlet, he/she has to find a tool to remove the netted member from the casing. The netted member removed from the air blowing device has to be kept carefully or it may be lost.

SUMMARY OF THE INVENTION

This invention relates to a position shifting plate for an air blowing device and includes a casing having an inlet defined in an underside of the casing and an outlet defined in an end of the casing. An annular neck extends from the underside of the casing and encloses the inlet. A gap is defined between the underside of the casing and the neck. A shifting plate has a netted portion and a hole. A flange extends from the shifting plate and two rails extend inward from the flange so as to be movably inserted in the gap. The shifting plate is shifted to let the hole or the netted portion to cover the inlet of the casing.

The primary object of the present invention is to provide a shifting plate that has a hole and a grated portion. The shifting plate is easily moved to engage with the inlet of the blowing device alternatively.

These objects, features, aspects and advantages of the present invention will become more obvious from a careful reading of a detailed description provided hereinafter with appropriate reference to the accompanying drawings.

BRIEF DESCRIPTION OF THE DRAWINGS

FIG; 1 is a perspective view to show the air blowing device of the present invention.

DETAILED DESCRIPTION OF THE INVENTION

Figure 1:
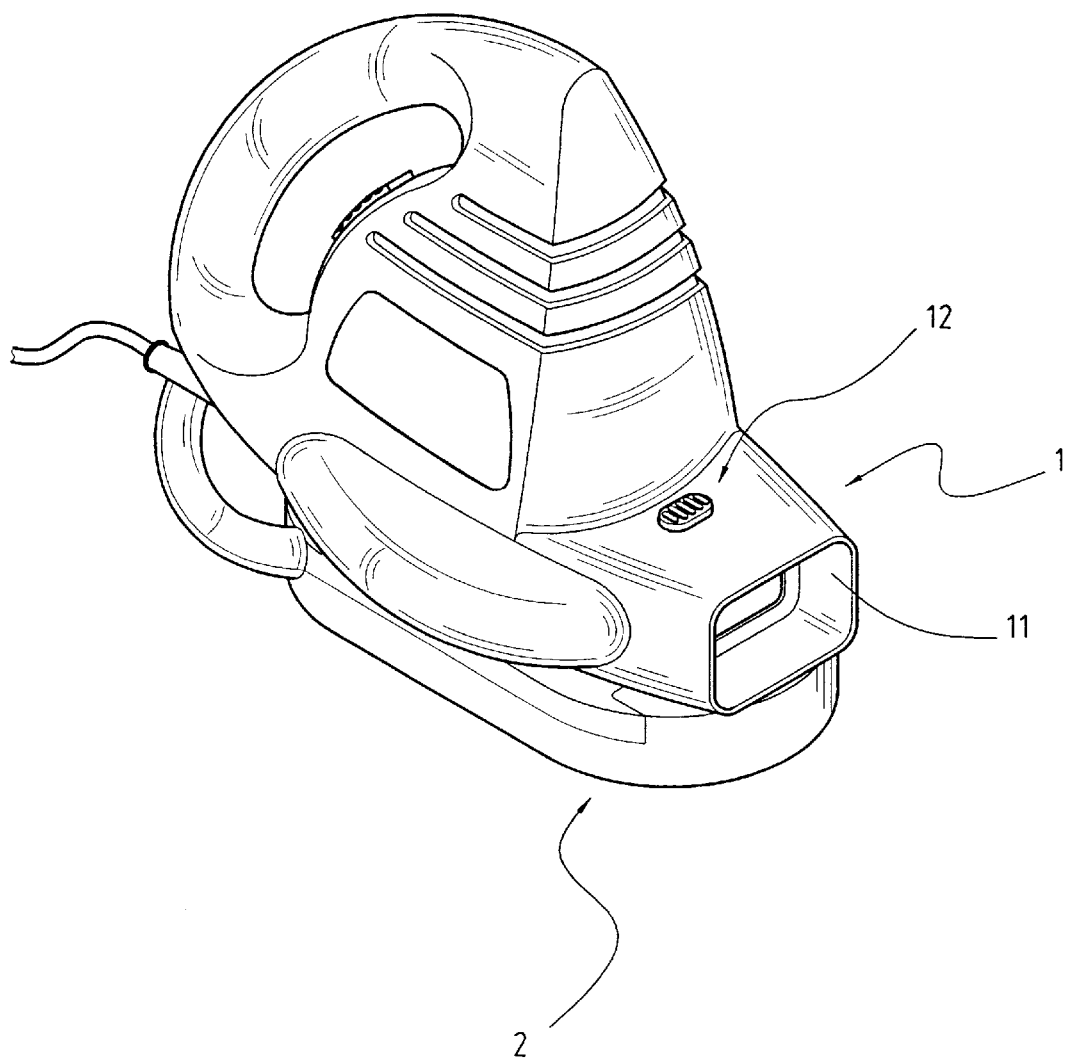
Figure 2:
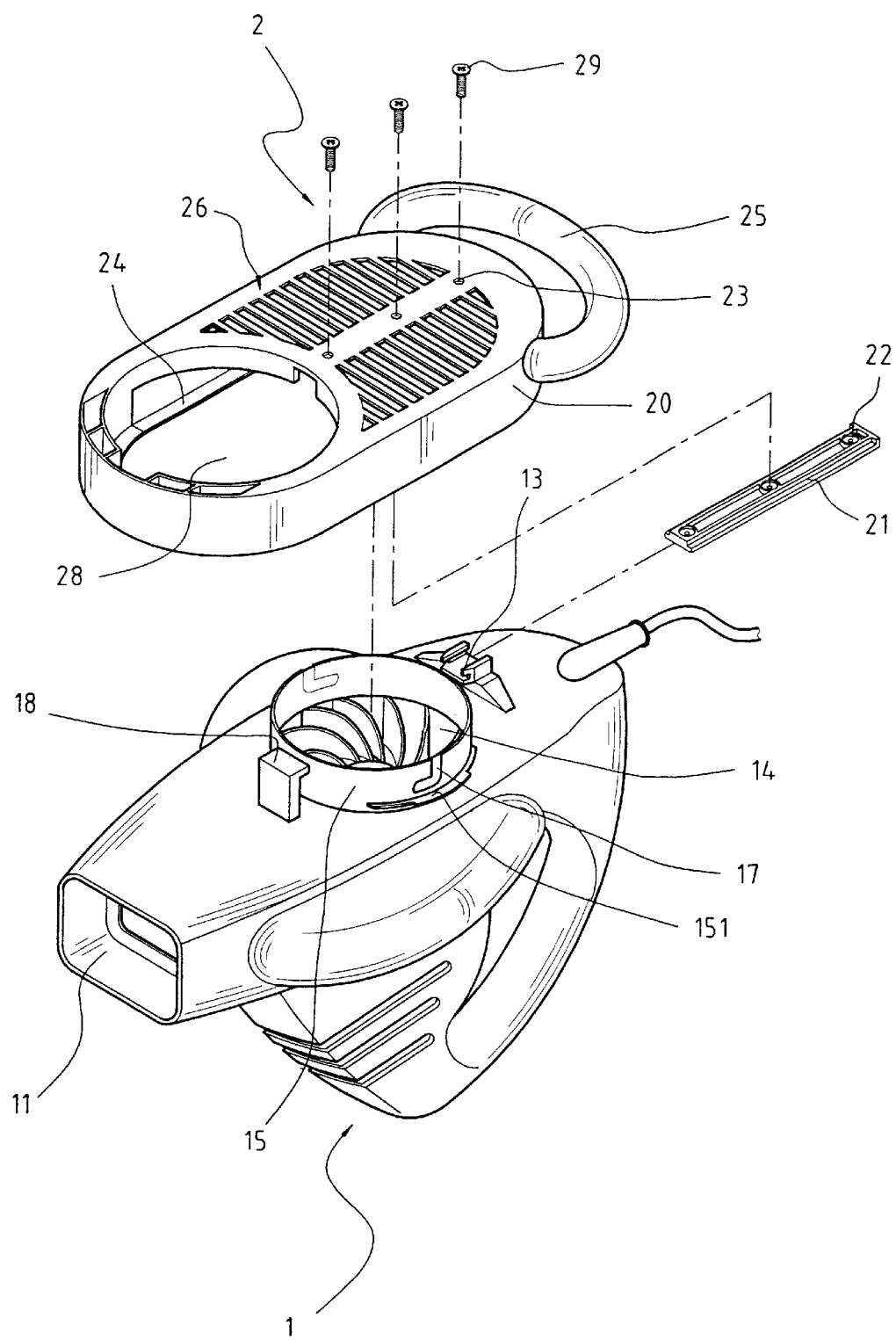
FIG. 2 is an exploded view to show the position shifting plate and the air blowing device of the present invention.
Figure 6:
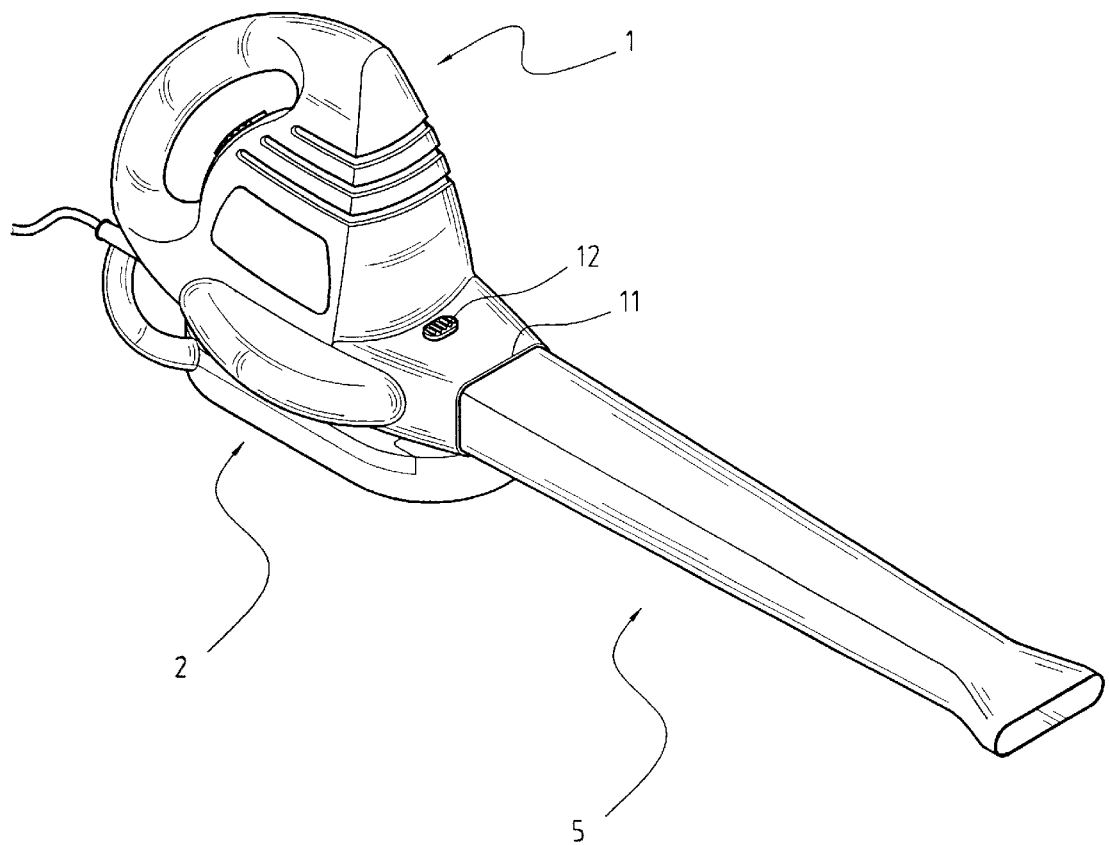
FIG. 6 is a perspective view to show a nozzle is connected to the outlet of the air blowing device of the present invention.

With reference to FIGS. 1 and 2, the air blowing device according to this invention comprises a casing 1 having an inlet 14 defined in an underside of the casing 1 and an outlet 11 defined in an end of the casing 1. A push-button 12 is located on a top surface of the casing 1 so as to quickly connect a long nozzle 5 as shown in FIG. 6. An annular neck 15 extends from the underside of the casing 1 and encloses the inlet 14. Two L-shaped slots 17 are defined in the neck 15 and open to a free edge of the neck 15. Only a part of the neck 15 is connected to the casing 1 and a gap 151 is defined between the underside of the casing 1 and the neck 15.

A shifting plate 2 has a grated portion 26 and a hole 28, and a handle 25 is connected to an end of the shifting plate 2. A flange 20 extends from the shifting plate 2 and two rails 24 extend inward from the flange 20. The rails 24 are movably inserted in the gap 151. A guide member 13 extends from the underside of the casing 1 and has two grooves. A stop 18 extends from the underside of the casing 1 and the inlet 14 is located between the stop 18 and the guide member 13.

A guide plate 21 has three holes 22 and is fixedly connected to the position shifting plate 2 by screws 29 extending through holes 23 in the shifting plate 2 and engaged with the holes 22 in the guide plate 21. Two sides of the guide plate 21 are movably received in the two grooves in the guide member 13.

Figure 3:
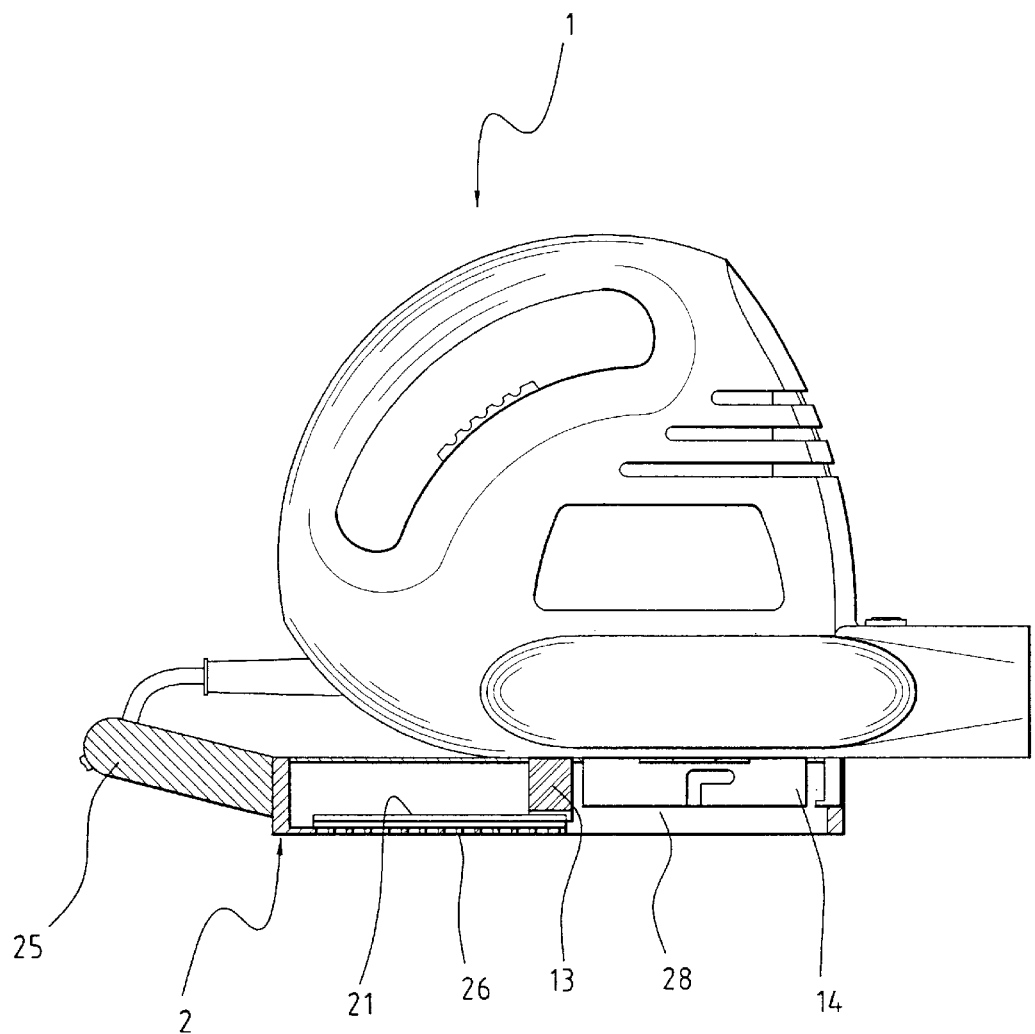
FIG. 3 is a cross sectional view to show that the hole of the shifting plate communicates with the inlet of the air blowing device of the present invention.
Figure 4:
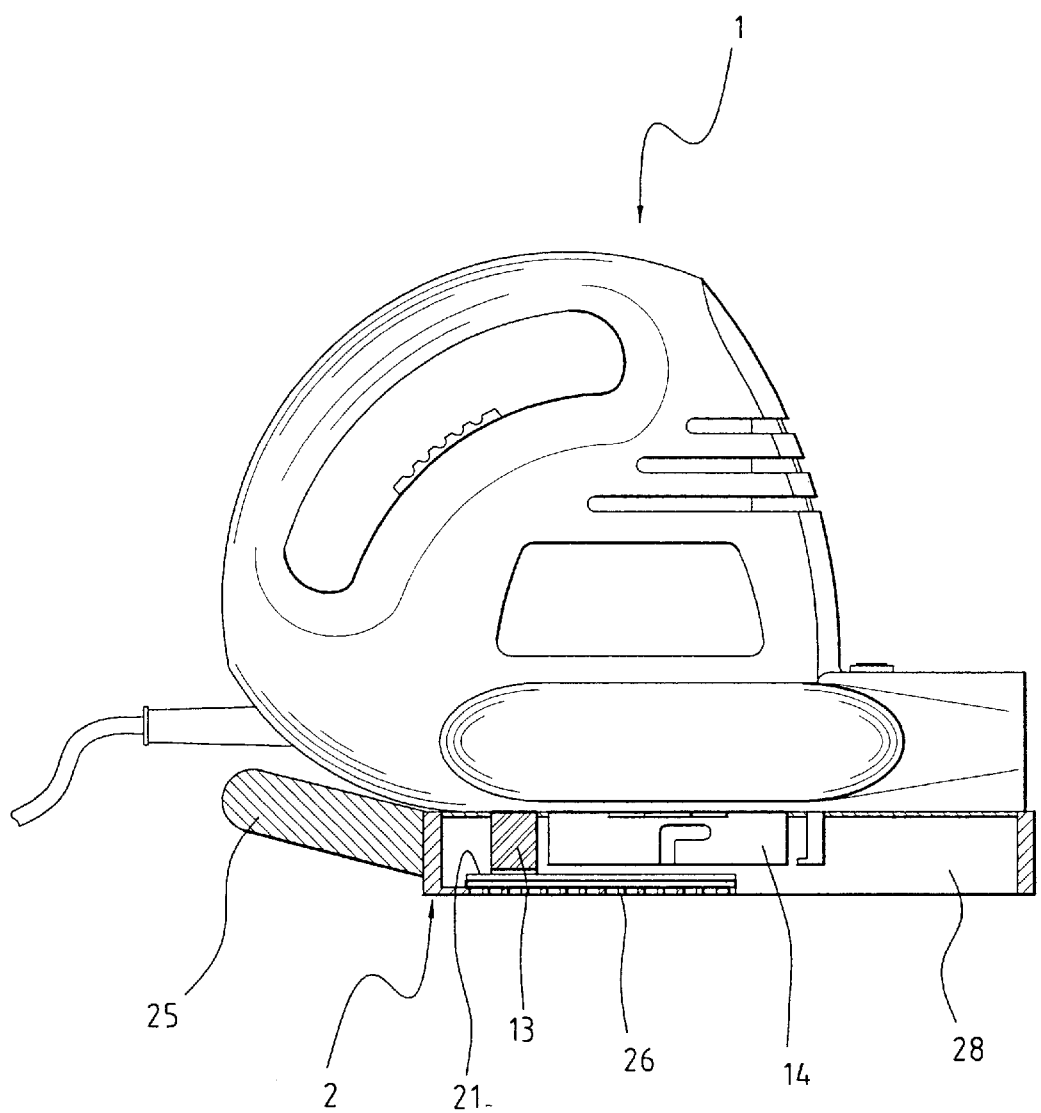
FIG. 4 is a cross sectional view to show that the netted portion of the shifting plate communicates with the inlet of the air blowing device of the present invention.
Figure 5:
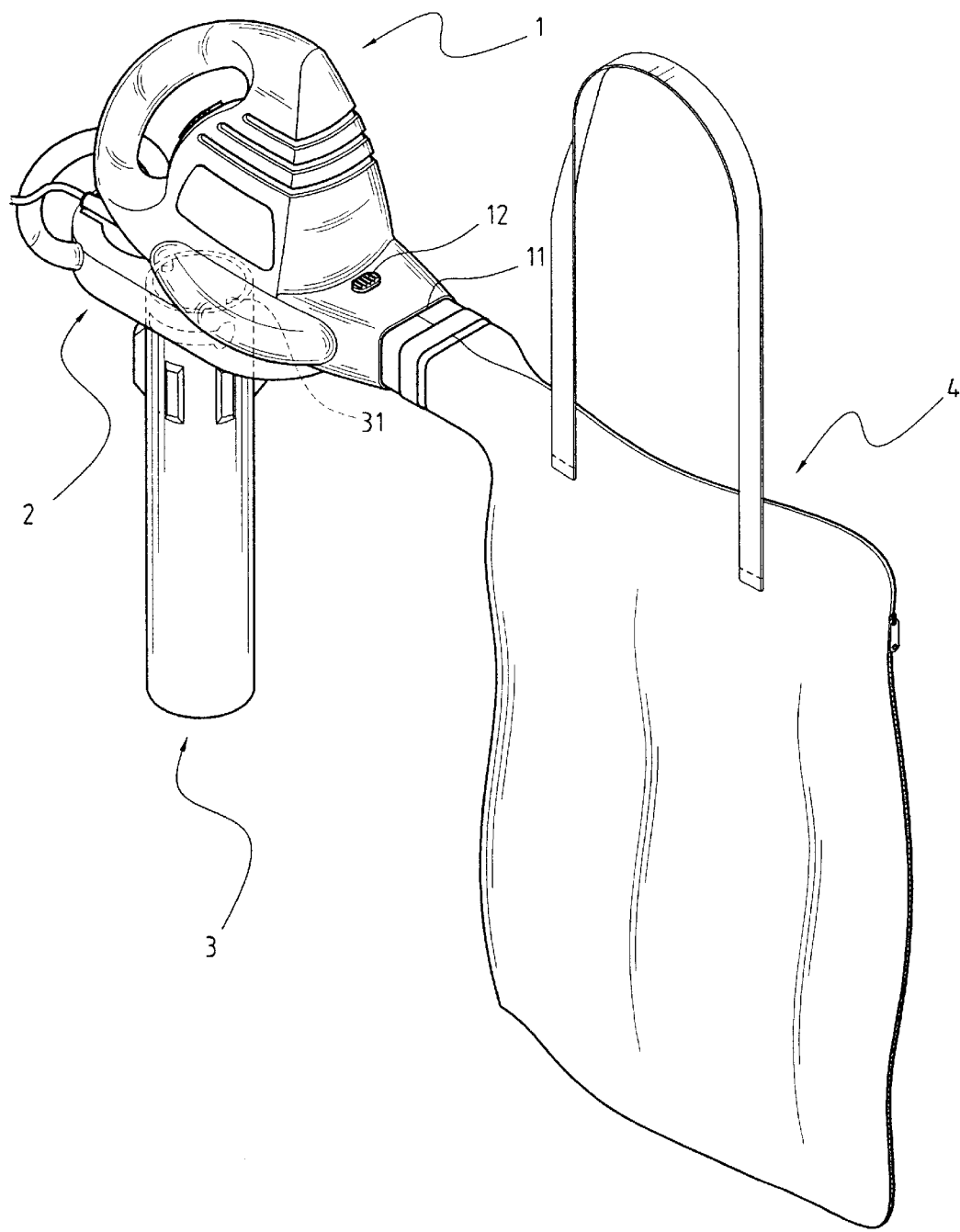
FIG. 5 is a perspective view to show a tube is connected to the inlet and a bag is connected to the outlet of the air blowing device of the present invention.

The position shifting plate 2 is easily moved relative to the neck 15. The engagement between the guide plate 21 and the guide member 13 ensures that the movement of the position shifting plate 2 is stable. The stop 18 prevents the position shifting plate 2 from being separated from the casing 1. Referring to FIG. 3, when the hole 28 is shifted to communicate with the inlet 14, a tube 3 as shown in FIG. 5 is connected to the neck 15. The tube 3 has protrusions 31 to be inserted in the L-shaped slots 17 in the neck 15 so as to securely connect the tube 3 and the neck 15. A bag 4 is mounted to the outlet 11 of the casing 1. The leaves or dirt sucked from the tube 3 is collected in the bag 4. When the grated portion 26 is shifted to the inlet 14 as shown in FIG. 4, the grated portion 26 effectively prevents objects from being entering the casing 1 via the inlet 14.

Although the present invention has been described with reference to the preferred embodiments, it will be understood that the invention is not limited to the details described thereof; Various substitutions and modifications can be made by those skilled in the art without departing from the scope of the invention as defined in the appended claims.

What is claimed is:

1. An air blowing device comprising:

a casing having an inlet defined in an underside of said casing and an outlet defined in an end of said casing, an annular neck extending from said underside of said casing and enclosing said inlet, a gap defined between said underside said casing and said neck, a device blowing air out the outlet, and a shifting plate having a grated portion and hole, a flange extending from said shifting plate and two rails extending inward from said flange, said rails movably inserted in said gap.

2. The air blowing device as claimed in claim 1, further comprising a guide member extending from said underside of said casing and said shifting plate movably contacting said guide member.

3. The air blowing device as claimed in claim 2, further comprising a stop extending from said underside of said casing and said inlet located between said stop and said guide member.

4. The air blowing device as claimed in claim 2, further comprising a guide plate fixedly connected to said position shifting plate and said guide member includes two grooves in which two sides of said guide plate are movably received.

5. The air blowing device as claimed in claim 1, further comprising a handle on an end of said position shifting plate.

6. The air blowing device as claimed in claim 1, wherein said neck has L-shaped slots opening to a free edge of said neck.

\* \* \* \* \*